US012090843B2

(12) United States Patent
Ishida et al.

(10) Patent No.: US 12,090,843 B2
(45) Date of Patent: Sep. 17, 2024

(54) DRIVE CONTROL DEVICE FOR VEHICLE

(71) Applicant: DENSO CORPORATION, Kariya (JP)

(72) Inventors: Minoru Ishida, Kariya (JP); Harumi Horihata, Kariya (JP)

(73) Assignee: DENSO CORPORATION, Kariya (JP)

( * ) Notice: Subject to any disclaimer, the term of this patent is extended or adjusted under 35 U.S.C. 154(b) by 252 days.

(21) Appl. No.: 17/863,649

(22) Filed: Jul. 13, 2022

(65) Prior Publication Data

US 2022/0348077 A1  Nov. 3, 2022

Related U.S. Application Data

(63) Continuation of application No. PCT/JP2021/000348, filed on Jan. 7, 2021.

(30) Foreign Application Priority Data

Jan. 14, 2020 (JP) .................................. 2020-003783
Dec. 1, 2020 (JP) .................................. 2020-199822

(51) Int. Cl.
*B60K 1/02* (2006.01)
*B60K 23/00* (2006.01)
*B60K 28/14* (2006.01)

(52) U.S. Cl.
CPC ............... *B60K 23/00* (2013.01); *B60K 1/02* (2013.01); *B60K 28/14* (2013.01)

(58) Field of Classification Search
CPC ........... B60K 23/00; B60K 1/02; B60K 28/14
See application file for complete search history.

(56) References Cited

U.S. PATENT DOCUMENTS

| 9,452,681 | B2* | 9/2016 | Mihara | ................... | B60L 3/003 |
| 10,978,984 | B2* | 4/2021 | Yoshida | ................... | H02P 5/74 |
| 2009/0251831 | A1* | 10/2009 | Shiba | ..................... | H02P 27/06 |
| | | | | | 361/30 |
| 2010/0025131 | A1* | 2/2010 | Gloceri | .................... | B60K 6/52 |
| | | | | | 180/65.265 |

(Continued)

FOREIGN PATENT DOCUMENTS

JP   2009-248680 A   10/2009
JP   2016-052164 A   4/2016

(Continued)

*Primary Examiner* — Dalena Tran
(74) *Attorney, Agent, or Firm* — Oliff PLC

(57) ABSTRACT

A drive control device is applicable to a vehicle including a first motor which drives a first wheel and a second motor which drives a second wheel. The drive control device includes a sensor, a torque setting section, an anomaly detection section, and an information output section. The sensor detects information about the drive control device. The torque setting section sets upper limit values of torques that can be generated by the first motor and the second motor based on the information detected by the sensor. The anomaly detection section detects an anomaly in the drive control device. In response to the anomaly detection section detecting the anomaly, the information output section outputs, to the torque setting section, setting information that sets the upper limit values of the torques of the first motor and the second motor to a common predetermined value, as the information.

19 Claims, 8 Drawing Sheets

(56) References Cited

U.S. PATENT DOCUMENTS

| | | | |
|---|---|---|---|
| 2010/0194318 A1* | 8/2010 | Aso | H01M 8/0494 |
| | | | 307/151 |
| 2013/0035203 A1* | 2/2013 | Arakawa | B60W 50/023 |
| | | | 477/5 |
| 2013/0341109 A1 | 12/2013 | Ozaki | |
| 2013/0345918 A1 | 12/2013 | Ozaki | |
| 2018/0257651 A1 | 9/2018 | Kitagawa | |

FOREIGN PATENT DOCUMENTS

| | | |
|---|---|---|
| JP | 2016-096594 A | 5/2016 |
| JP | 2016-134983 A | 7/2016 |
| JP | 2018-098872 A | 6/2018 |
| JP | 2019-110672 A | 7/2019 |
| JP | 2019-202571 A | 11/2019 |

* cited by examiner

DRIVE CONTROL DEVICE FOR VEHICLE

CROSS-REFERENCE TO RELATED APPLICATION

The present application is a continuation application of International Application No. PCT/JP2021/000348, filed on Jan. 7, 2021, which claims priority to Japanese Patent Application No. 2020-003783 filed Jan. 14, 2020 and Japanese Patent Application No. 2020-199822 filed Dec. 1, 2020. The contents of these applications are incorporated herein by reference in their entirety.

BACKGROUND

Technical Field

The present disclosure relates to a drive control device for controlling a driving state of a vehicle.

Background Art

Conventionally, there is a drive control device that, when an anomaly other than the stopping of a motor is detected in a motor of one of left and right wheels of a vehicle, controls the motor of the other wheel to approach the same operating condition as the operating condition of the motor in which the anomaly has been detected.

SUMMARY

In the present disclosure, provided is a drive control device applicable to a vehicle as the following.

The drive control device applicable to a vehicle including a first motor which drives a first wheel and a second motor which drives a second wheel, the drive control device comprising:

a sensor configured to detect information about the drive control device;

a torque setting section configured to set upper limit values of torques that can be generated by the first motor and the second motor based on the information detected by the sensor;

an anomaly detection section configured to detect an anomaly in the drive control device;

an information output section configured to, in response to the anomaly detection section detecting the anomaly, output, to the torque setting section, setting information that sets the upper limit values of the torques of the first motor and the second motor to a common predetermined value, as the information; and a drive control section configured to control the torques generated by the first motor and the second motor to become less than or equal to the upper limit values set by the torque setting section.

BRIEF DESCRIPTION OF THE DRAWINGS

The above-mentioned and other objects, features, and advantages of this disclosure will become more apparent by reference to the following description taken in conjunction with the accompanying drawings, in which.

DETAILED DESCRIPTION OF THE PREFERRED EMBODIMENTS

[PTL 1] JP 5784930B

Figure 1:
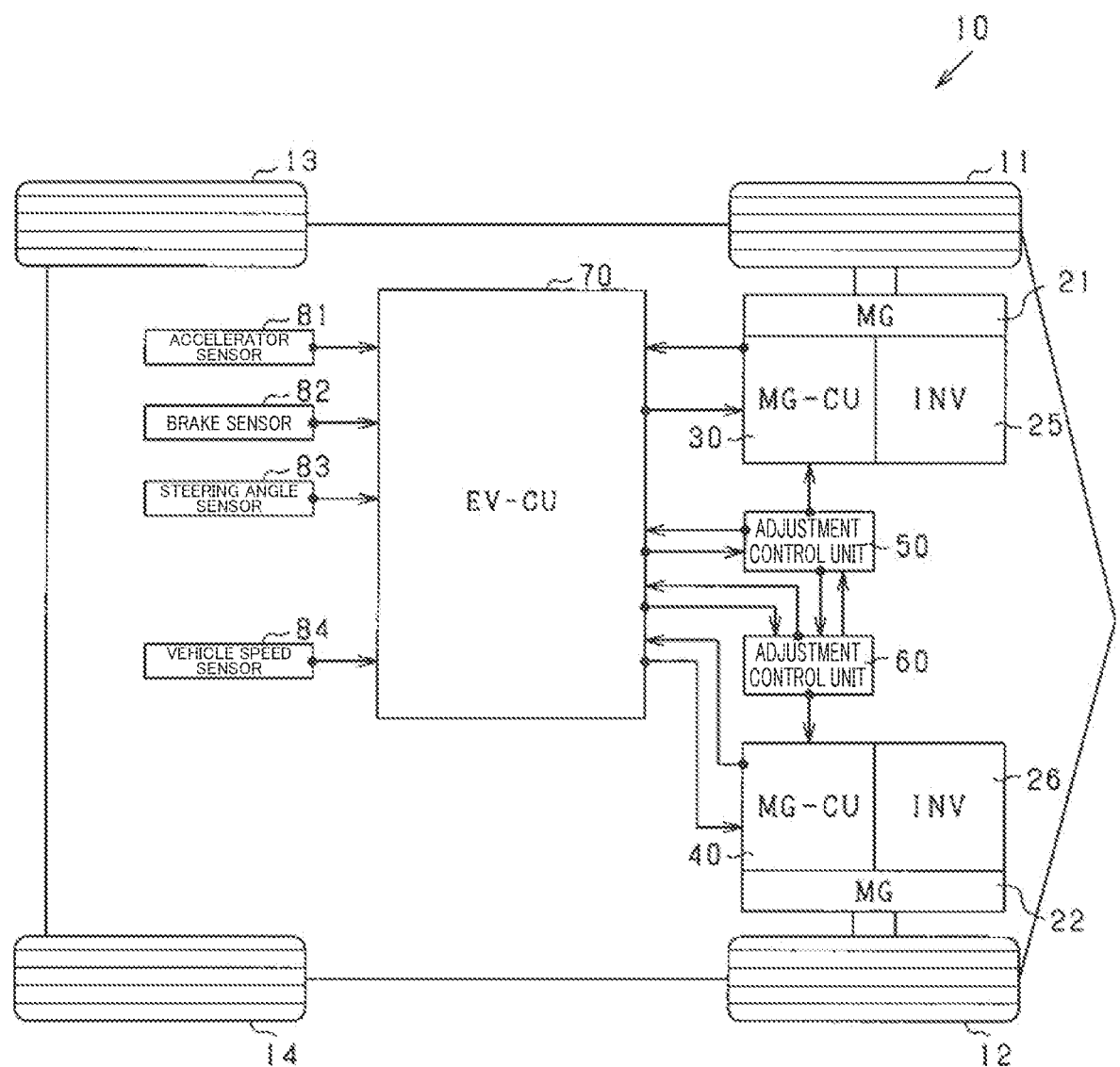
FIG. 1 is a schematic diagram illustrating an electric vehicle.

In the drive control device of PTL 1, controlling the motor in a normal operating condition to approach the same operating condition as the operating condition of the motor in which an anomaly has been detected may possibly be unsuitable for handling the anomaly. For example, when the torque of one motor is rapidly decreased due to an anomaly, controlling the other motor to approach the same operating condition as the operating condition of the one motor may possibly cause the vehicle to rapidly decelerate. However, when the torque of one motor is rapidly decreased due to an anomaly, and the torque of the other motor is left unlimited, the difference between the torques of the left and right motors is increased. This may possibly cause the behavior of the vehicle to become unstable.

The present disclosure has been accomplished to solve the above problems and mainly aims at providing a drive control device for a vehicle that inhibits the torque of a motor from rapidly decreasing while inhibiting the behavior of the vehicle from becoming unstable when an anomaly is detected.

To solve the above problems, the first means provides a drive control device applicable to a vehicle including a first motor which drives a first wheel and a second motor which drives a second wheel, the second wheel being independently from the first wheel. The drive control device includes a sensor, a torque setting section, an anomaly detection section, an information output section, and a drive control section. The sensor is configured to detect information about the drive control device. The torque setting section is configured to set upper limit values of torques that can be generated by the first motor and the second motor based on the information detected by the sensor. The anomaly detection section is configured to detect an anomaly in the drive control device. The information output section is configured to, in response to the anomaly detection section detecting the anomaly, output, to the torque setting section, setting information that sets the upper limit values of the torques of the first motor and the second motor to a common predetermined value, as the information. The drive control section is configured to control the torques generated by the first motor and the second motor to become less than or equal to the upper limit values set by the torque setting section.

With the above configuration, the drive control device is applicable to a vehicle including a first motor, which drives a first wheel, and a second motor, which drives a second wheel. The sensor detects information about the drive control device. The torque setting section sets upper limit values of torques that can be generated by the first motor and the second motor based on the information detected by the sensor. Thus, when the information about the drive control device detected by the sensor is the information using which the upper limit values of the torques that can be generated by the motors should be set, the upper limit values of the torques are set based on that information.

The anomaly detection section detects an anomaly in the drive control device. In response to the anomaly detection section detecting an anomaly, the information output section outputs, to the torque setting section, the upper limit values of the torques of the first motor and the second motor to setting information that sets a common predetermined value, as the information. As a result, the torque setting section sets the upper limit values of the torques of the first motor and the second motor to the common predetermined value based on the setting information. The drive control section controls the torques generated by the first motor and the second motor to be less than or equal to the upper limit values set by the torque setting section. This reduces the torque difference between the left and right motors and inhibits the behavior of the vehicle from becoming unstable. Furthermore, the upper limit values of the torques of the first motor and the second motor are set instead of the torques generated by the first motor and the second motor being reduced. This inhibits the torques of the motors from rapidly decreasing and inhibits the vehicle from rapidly decelerating. Moreover, since the torques of the motors are limited upon detection of an anomaly using an upper limit torque setting section generally included in the drive control device, additional structures are inhibited from increasing.

The drive control device generally includes a sensor configured to detect temperature information. Specifically, the drive control device generally includes a temperature sensor, which detects the temperature of the motor, and a torque setting section, which sets the upper limit values of the torques that can be generated by the motors based on the temperature of the motor.

In this respect, according to the second means, the sensor is configured to detect temperature information as the information. According to the third means, the temperature information is a temperature of at least one of the first motor and the second motor. Thus, the torques of the motors are limited upon detection of an anomaly using the temperature sensor for a motor and the torque setting section, which sets the upper limit values of the torques based on the motor temperature. The temperature sensor and the torque setting section are generally included in the drive control device.

The drive control device that includes an AC motor generally includes a temperature sensor, which detects the temperature of a power inverter, and a torque setting section, which sets the upper limit values of the torques that can be generated by the motors based on the temperature of the power inverter.

In this respect, according to the fourth means, the first motor and the second motor are AC motors. The fourth means includes: a first power inverter which changes supplied DC power to AC power and supplies the AC power to the first motor, and a second power inverter which changes the supplied DC power to AC power and supplies the AC power to the second motor. The sensor is configured to detect a temperature of at least one of the first power inverter and the second power inverter as the temperature information. Thus, the torques of the motors are limited upon detection of an anomaly using the temperature sensor of the power inverter and the torque setting section, which sets the upper limit values of the torques based on the temperature of the power inverter. The temperature sensor and the torque setting section are generally included in the drive control device including the AC motor.

The drive control device generally includes a temperature sensor, which detects the temperature of a coolant, and a torque setting section, which sets the upper limit values of the torques that can be generated by the motors based on the temperature of the coolant.

In this respect, according to the fifth means, the sensor is configured to detect a temperature of a coolant as the temperature information. Thus, the torques of the motors are limited upon detection of an anomaly using the temperature sensor for a coolant and the torque setting section which sets the upper limit values of the torques based on the temperature of the coolant. The temperature sensor and the torque setting section are generally included in the drive control device.

When a high voltage is applied across the coils of the motors, the lower the atmospheric pressure, the more likely partial discharge occurs. For this reason, the drive control device may include an atmospheric pressure sensor that detects the atmospheric pressure. The lower the detected atmospheric pressure, the more the rising of the voltage of the power inverters may be retarded. In this case, the more the rising of the voltage is retarded, the greater the temperature increase of the power inverters becomes. Thus, the torque setting section may be provided that sets the limits in such a manner that the lower the atmospheric pressure, the lower the upper limit values of the torques of the motors become.

In this respect, according to the sixth means, the first motor and the second motor are AC motors. The sixth means includes: a first power inverter which changes supplied DC power to AC power and supplies the AC power to the first motor, and a second power inverter which changes the supplied DC power to AC power and supplies the AC power to the second motor. The sensor is configured to detect an atmospheric pressure as the information. Thus, the drive control device that includes the atmospheric pressure sensor and the torque setting section, which sets the upper limit values of the torques so as to limit the upper limit values of the torques based on the atmospheric pressure, limits the torques of the motors upon detection of an anomaly using the atmospheric pressure sensor and the torque setting section.

How much the upper limit values of the torques of the motors should be limited changes in accordance with the speed of the vehicle when an anomaly has been detected.

In this respect, according to the seventh means, the sensor is configured to detect a speed of the vehicle as the information. Thus, the upper limit values of the torques of the first motor and the second motor can be set based on the speed of the vehicle when an anomaly has been detected.

When information is not input from the sensor that detects the information about the drive control device, there is a risk that the motor cannot be driven appropriately. Thus, the drive control device generally includes the torque setting section, which sets the upper limit values of the torques that can be generated by the first motor and the second motor when the information is not input from the sensor.

In this respect, according to the eighth means, the torque setting section is configured to set the upper limit values of the torques that can be generated by the first motor and the second motor, when the information is not input from the sensor. The information output section is configured to disconnect the sensor from the torque setting section, in response to the anomaly detection section detecting the anomaly. Thus, in response to the detection of an anomaly, the state in which the information is not input to the torque setting section from the sensor is intentionally made. Thus, the torques of the motors are limited upon detection of an anomaly using the torque setting section, which is generally included in the drive control device and sets the upper limit values of the torques of the motors when the information is not input from the sensor.

The ninth means includes a current sensor configured to detect a current that flows through the first motor. The anomaly detection section is configured to previously specify a predetermined range in which a relationship between a command value of a torque to be generated by the second motor and a current that flows through the first motor is normal, and detect the anomaly in the drive control device when the relationship between the command value and the current detected by the current sensor is out of the predetermined range.

With the above configuration, the current sensor detects the current that flows through the first motor. The torque generated by the first motor changes in accordance with the current that flows through the first motor. When the torque difference between the first motor and the second motor is increased, the behavior of the vehicle may possibly become unstable. For this reason, an appropriate range of the current that flows through the first motor is previously determined for the command value of the torque to be generated by the second motor.

Given these circumstances, the anomaly detection section previously specifies a predetermined range in which the relationship between the command value of the torque to be generated by the second motor and the current that flows through the first motor is normal. When the relationship between the command value of the torque of the second motor and the current of the first motor detected by the current sensor is out of the predetermined range, an anomaly in the drive control device is detected. Thus, when there is a risk that the behavior of the vehicle will become unstable, an anomaly in the drive control device can be detected.

According to the tenth means, the anomaly detection section includes a first detector configured to detect an anomaly related to the first motor, and a second detector configured to detect an anomaly related to the second motor. The tenth means includes an upper-level control unit configured to transmit both a first command value and a second command value to both the first detector and the second detector, the first command value being a command value of a torque to be generated by the first motor, the second command value being a command value of a torque to be generated by the second motor. The first detector is configured to transmit the second command value received from the upper-level control unit to the second detector. The second detector is configured to transmit the first command value received from the upper-level control unit to the first detector. The first detector is configured to detect the anomaly in the drive control device when an absolute value of a difference between the first command value received from the upper-level control unit and the first command value received from the second detector is greater than a predetermined value. The second detector is configured to detect the anomaly in the drive control device when an absolute value of a difference between the second command value received from the upper-level control unit and the second command value received from the first detector is greater than a predetermined value.

With the above configuration, the first detector detects an anomaly related to the first motor, and the second detector detects an anomaly related to the second motor. The upper-level control unit transmits both a first command value and a second command value to both the first detector and the second detector, the first command value being a command value of a torque to be generated by the first motor, the second command value being a command value of a torque to be generated by the second motor. That is, the first detector receives not only the first command value but also the second command value, and the second detector receives not only the second command value but also the first command value. The first detector transmits the second command value received from the upper-level control unit to the second detector, and the second detector transmits the first command value received from the upper-level control unit to the first detector.

For example, when the first command value transmitted by the upper-level control unit is received properly, the first command value that the first detector has received from the upper-level control unit is supposed to match with the first command value that the first detector has received from the second detector. In contrast, when the first command value that the first detector has received from the upper-level control unit does not match with the first command value that the first detector has received from the second detector, the first command value transmitted by the upper-level control unit might not be received properly.

In this respect, the first detector detects an anomaly in the drive control device when an absolute value of a difference between the first command value received from the upper-level control unit and the first command value received from the second detector is greater than a predetermined value. Furthermore, the second detector detects an anomaly in the drive control device when an absolute value of a difference between the second command value received from the upper-level control unit and the second command value received from the first detector is greater than a predetermined value. Thus, an anomaly in the drive control device can be detected when there is a risk that the command value of the torque transmitted by the upper-level control unit is not received properly.

In the eleventh means, the anomaly detection section is configured to detect an anomaly state, which is a state of the anomaly in the drive control device. The information output section is configured to output, to the torque setting section, the setting information that sets the upper limit values of the torques of the first motor and the second motor to the common predetermined value corresponding to the anomaly state, as the information, in response to the anomaly detection section detecting the anomaly state.

The twelfth means provides a drive control device applicable to a vehicle including a first motor which drives a first wheel and a second motor which drives a second wheel, the second wheel being independently from the first wheel. The drive control device includes a sensor, torque setting section, an anomaly processing section, and a drive control section. The sensor is configured to detect information about the drive control device. The torque setting section is configured to set upper limit values of torques that can be generated by the first motor and the second motor based on the information detected by the sensor. The anomaly processing section configured to: detect an anomaly state, which is a state of an anomaly of the drive control device, and output, to the torque setting section, setting information that sets the upper limit values of the torques of the first motor and the second motor to a common predetermined value corresponding to the anomaly state, as the information, in response to detecting the anomaly state. The drive control section is configured to control the torques generated by the first motor and the second motor to become less than or equal to the upper limit values set by the torque setting section.

With the above configuration, the anomaly state, which is the state of an anomaly of the drive control device, is detected. Thus, not only an anomaly in the drive control device but also an anomaly state, which is the state of an anomaly of the drive control device, is detected. In response to the detection of an anomaly state, the setting information that sets the upper limit values of the torques of the first motor and the second motor to the common predetermined value corresponding to the anomaly state is output to the torque setting section, as the information. Thus, the upper limit values of the torques of the first motor and the second motor is set to the common predetermined value in accordance with the anomaly state. Thus, the upper limit values of the torques of the first motor and the second motor are more appropriately set. This further inhibits the behavior of the vehicle from becoming unstable and the vehicle from rapidly decelerating.

According to the thirteenth means, the drive control section is capable of executing a first control mode and a second control mode, which differ from each other in a mode of controlling torques generated by the first motor and the second motor, and in response to detection of the anomaly state, the common predetermined value corresponding to the anomaly state is set to a value corresponding to which of the first control mode and the second control mode is executed by the drive control section.

With the above configuration, the drive control section is capable of executing a first control mode and a second control mode, which differ from each other in a mode of controlling torques generated by the first motor and the second motor. Thus, the first control mode and the second control mode are selected in accordance with the traveling condition of the vehicle. The influence of an anomaly on the torques when the anomaly occurs in the drive control device differs between the first control mode and the second control mode, which differ from each other in the mode of controlling the torques.

In this respect, the common predetermined value corresponding to the anomaly state is set to a value corresponding to which of the first control mode and the second control mode is executed by the drive control section, when an anomaly state is detected. Thus, the upper limit values of the torques of the first motor and the second motor is appropriately set to the common predetermined value in accordance with the influence of the anomaly on the torques depending on which of the first control mode and the second control mode is executed.

Even in the event of an anomaly in the command value of the torques to be generated by the first motor and the second motor, the risk to the vehicle is small unless the torque is erroneously increased.

In this respect, according to the fourteenth means, in response to an anomaly occurring in at least one of a first command value, which is a command value of a torque to be generated by the first motor, and a second command value, which is a command value of a torque to be generated by the second motor, the common predetermined value corresponding to the anomaly state is set to the first command value or the second command value used in a predetermined period before the event of the anomaly.

With the above configuration, even in the event of an anomaly in at least one of the first command value and the second command value, the upper limit values of the torques is set to the first command value or the second command value used in the predetermined period before the event of the anomaly. This inhibits the torques generated by the first motor and the second from erroneously increasing and allows the vehicle to travel safely. Furthermore, even in the event of an anomaly in the command value of the torque, the vehicle is kept traveling without lowering the upper limit of the torques as much as possible from the state before the event of the anomaly.

According to the fifteenth means, the sensor includes a current sensor configured to detect a current that flows through at least one of the first motor and the second motor, and when a reference output, which is an output of the current sensor when the current is detected as zero, is out of a predetermined range, the common predetermined value corresponding to the anomaly state is set to a first command value or a second command value, the first command value being a command value of a torque to be generated by the first motor used in a predetermined period before the reference output is out of the predetermined range, and the second command value being a command value of a torque to be generated by the second motor used in the predetermined period before the reference output is out of the predetermined range.

With the above configuration, the sensor includes a current sensor, which detects a current that flows through at least one of the first motor and the second motor. Even when the reference output, which is an output of the current sensor when the current is detected as zero, is out of the predetermined range (hereinafter, referred to as the "offset anomaly"), the detected current rarely changes abruptly. In this respect, even in the event of an offset anomaly, the upper limit values of the torques is set to the first command value or the second command value used in the predetermined period before the event of the offset anomaly. This allows the vehicle to keep traveling without lowering the upper limit of the torques as much as possible while allowing the vehicle to travel safely.

In the event of a predetermined anomaly in the current sensor other than the offset anomaly, a current may possibly be detected erroneously, resulting in an abrupt change in the torques generated by the first motor and the second motor.

In this respect, according to the sixteenth means, in response to detection of a predetermined anomaly in the current sensor other than a case in which the reference output is out of the predetermined range, the common predetermined value corresponding to the anomaly state is set to a first correction command value or a second correction command value, the first correction command value being obtained by reducing the first command value used in a predetermined period before the detection of the predetermined anomaly by a predetermined degree, and the second correction command value being obtained by reducing the second command value used in the predetermined period before the detection of the predetermined anomaly by a predetermined degree.

With the above configuration, in response to detection of a predetermined anomaly other than the offset anomaly, the upper limit values of the torques of the first motor and the second motor is set to the first correction command value or the second correction command value. The first correction command value is obtained by reducing the first command value used in the predetermined period before the predetermined anomaly is detected by a predetermined degree. The second correction command value is obtained by reducing the second command value used in the predetermined period before the predetermined anomaly is detected by a predetermined degree. Thus, the vehicle is allowed to keep traveling while traveling safely when there is a risk that the torques generated by the first motor and the second motor will change abruptly.

According to the seventeenth means, the sensor includes a voltage sensor configured to detect a voltage that is applied to at least one of the first motor and the second motor, and in response to detection of an anomaly in the voltage sensor, the common predetermined value corresponding to the anomaly state is set to a first command value or a second command value, the first command value being a command value of a torque to be generated by the first motor used in a predetermined period before the detection of the anomaly in the voltage sensor, the second command value being a command value of a torque to be generated by the second motor used in the predetermined period before the detection of the anomaly in the voltage sensor.

With the above configuration, the sensor includes a voltage sensor, which detects a voltage applied to at least one of the first motor and the second motor. Even in an event of an anomaly in the voltage sensor, unless the currents that flow through the first motor and the second motor change abruptly, the torques rarely change abruptly. In this respect, in response to the detection of an anomaly in the voltage sensor, the upper limit values of the torques is set to the first command value or the second command value used in the predetermined period before the anomaly is detected in the voltage sensor. This allows the vehicle to keep traveling without lowering the upper limit values of the torques as much as possible while allowing the vehicle to travel safely.

In the event of an anomaly in a rotational angle sensor, which detects the rotational angle of the motor, the motor can no longer be controlled appropriately in accordance with the rotational angle, and the torques generated by the first motor and the second motor may possibly change abruptly.

In this respect, according to the eighteenth means, the sensor includes a rotational angle sensor configured to detect a rotational angle of at least one of the first motor and the second motor, and the common predetermined value corresponding to the anomaly state is set to zero when there is an anomaly in the rotational angle sensor. Thus, when there is a risk that the motors cannot be controlled appropriately, a high priority is given to safety, and the vehicle is exceptionally stopped.

In an event of an anomaly in a calculation function of at least one of the torque setting section and the drive control section, the motors can no longer be controlled appropriately, and the torques generated by the first motor and the second motor may possibly change abruptly.

In this respect, according to the nineteenth means, the common predetermined value corresponding to the anomaly state is set to zero when there is an anomaly in a calculation function of at least one of the torque setting section and the drive control section. Thus, when there is a risk that the motors cannot be controlled appropriately, a high priority is given to safety, and the vehicle is exceptionally stopped.

First Embodiment

Hereinafter, a first embodiment of a drive control device applicable to an electric vehicle will be described with reference to the drawings.

As shown in FIG. 1, an electric vehicle 10 (vehicle) includes wheels 11 to 14, motor-generators (MG) 21 and 22, inverters (INV) 25 and 26, motor-generator control units (MG-CU) 30 and 40, adjustment control units (CU) 50 and 60, and an electric vehicle control unit (EV-CU) 70.

The left wheel 11 (first wheel) and the right wheel 12 (second wheel) on the front are driving wheels that drive the electric vehicle 10. The left and right wheels 13 and 14 on the rear are driven wheels that are driven as the electric vehicle 10 travels. The wheels 11 and 12 are steered wheels that move in accordance with the operation of a steering wheel and change the moving direction of the electric vehicle 10. The wheels 11 and 12 are driven by the motor-generators 21 and 22, respectively.

The motor-generator 21 (first motor) and the motor-generator 22 (second motor) are three-phase AC motor-generators (AC motors). The motor-generator 21 functions to drive the wheel 11 based on the electric power supplied from the inverter 25 and functions to generate electric power based on the rotation of the wheel 11. The motor-generator 22 functions to drive the wheel 12 based on the electric power supplied from the inverter 26 and functions to generate electric power based on the rotation of the wheel 12. The motor-generators 21 and 22 drive the wheels 11 and 12 independently from each other. The inverters 25 and 26 change DC power supplied from a battery (not shown) to AC power and supply the AC power to the motor-generators 21 and 22, respectively. The inverters 25 and 26 are circuits in which, for example, six switching elements are connected in a three-phase bridge configuration. The inverter 25 (first power inverter) and the inverter 26 (second power inverter) change the AC power supplied by the power generation of the motor-generators 21 and 22 to DC power and supply the DC power to the battery. The driving states of the inverters 25 and 26 are controlled by the MG-CUs 30 and 40, respectively. In this description, the three-phase AC is described as an example, but the number of the phases is not limited to three phases and may be, for example, six or nine phases.

The EV-CU 70 (upper-level control unit) performs overall control of the electric vehicle 10. The EV-CU 70 is a microcomputer including, for example, a CPU, a RAM, a ROM, and an I/O interface. The EV-CU 70 receives detection values from, for example, an accelerator sensor 81, a brake sensor 82, a steering angle sensor 83, and a vehicle speed sensor 84.

The accelerator sensor 81 detects the depression amount of an accelerator pedal (not shown). The brake sensor 82 detects the depression amount of a brake pedal (not shown). The steering angle sensor 83 (sensor) detects the steering angle of a steering wheel (not shown). The vehicle speed sensor 84 detects the speed (vehicle speed) of the electric vehicle 10.

The EV-CU 70 executes a variety of controls for the electric vehicle 10 based on, for example, the detection values of the sensors 81 to 84. The EV-CU 70 generates command values of torques to be generated by the motor-generators 21 and 22 (hereinafter, referred to as "torque command values") based on, for example, the detection values of the sensors 81 to 84. The EV-CU 70 transmits the generated torque command values to the MG-CUs 30 and 40. The EV-CU 70 transmits the torque command value for the motor-generator 21 to the adjustment control unit 50 and the torque command value for the motor-generator 22 to the adjustment control unit 60. The MG-CUs 30 and 40 are microcomputers including, for example, a CPU, a RAM, a ROM, and an I/O interface. The MG-CUs 30 and 40 control the driving state of the respective inverters 30 and 50 to control the driving and power generation of the motor-generators 21 and 22.

The adjustment control units 50 and 60 are microcomputers including, for example, a CPU, a RAM, a ROM, and an I/O interface. The adjustment control unit 50 detects an anomaly in, for example, the motor-generator 21, the inverter 25, the MG-CU 30, and the EV-CU 70. The adjustment control unit 60 detects an anomaly in, for example, the motor-generator 22, the inverter 26, the MG-CU 40, and the EV-CU 70. Upon detecting an anomaly, the adjustment control unit 50 notifies the EV-CU 70 and the adjustment control unit 60 of the anomaly. Upon detecting an anomaly, the adjustment control unit 60 notifies the EV-CU 70 and the adjustment control unit 50 of the anomaly.

The configuration of the MG-CU 30 is basically the same as the configuration of the MG-CU 40, and the configuration of the adjustment control unit 50 is basically the same as the configuration of the adjustment control unit 60. For this reason, the MG-CU 30 and the adjustment control unit 50 will be described below as an example.

Figure 2:
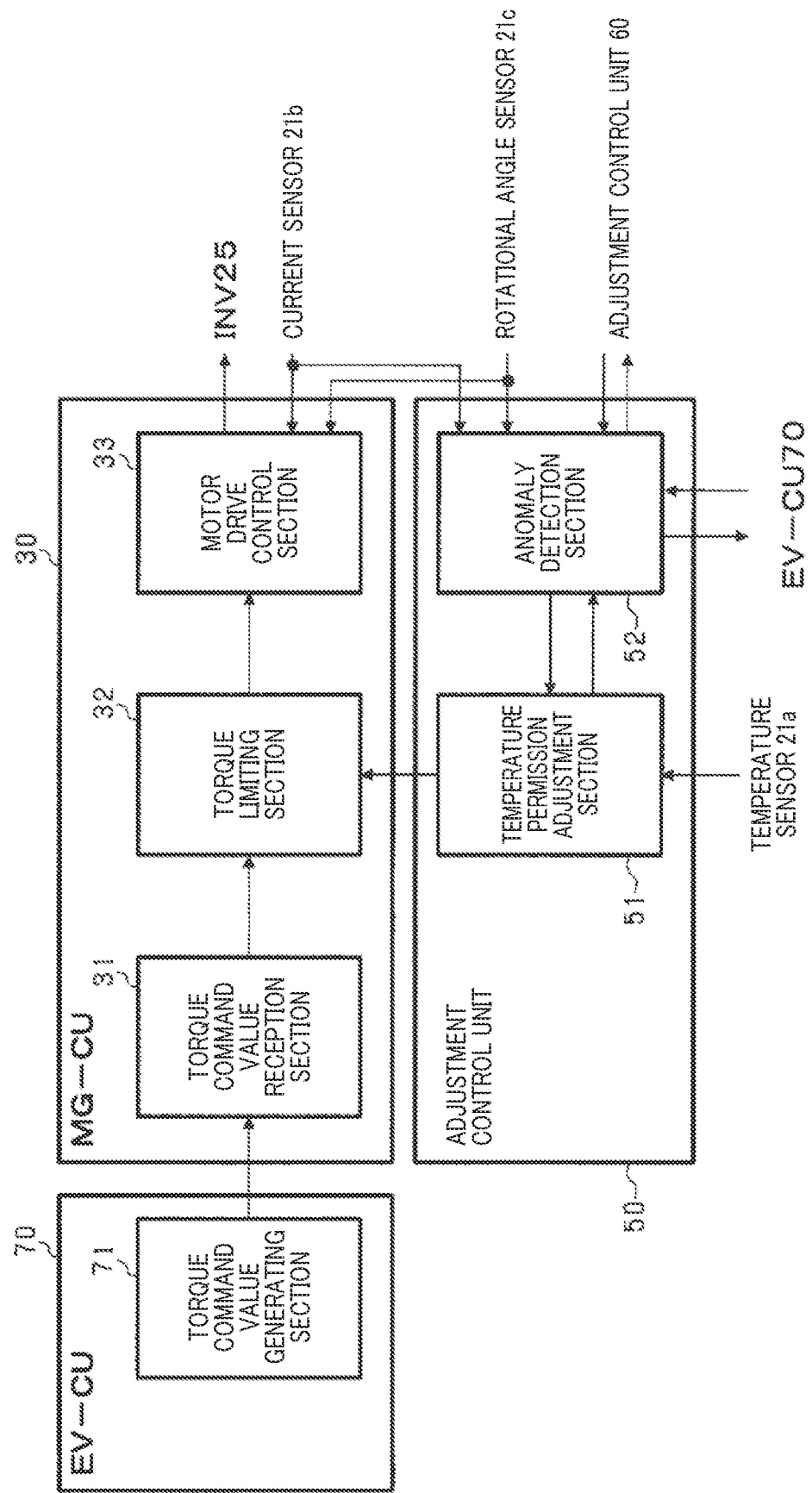
FIG. 2 is a block diagram illustrating the configuration of an electric vehicle control unit (EV-CU), a motor-generator control unit (MG-CU), and an adjustment control unit (CU)

As shown in FIG. 2, the EV-CU 70 includes a torque command value generating section 71. The torque command value generating section 71 generates torque command values for the motor-generators 21 and 22 based on, for example, the detection values of the sensors 81 to 84. The torque command value generating section 71 transmits the torque command value for the motor-generator 21 to the MG-CU 30.

The MG-CU 30 includes a torque command value reception section 31, a torque limiting section 32, and a motor drive control section 33. The torque command value reception section 31 functions to receive information transmitted from the EV-CU 70. The torque command value reception section 31 receives a torque command value (left torque command value) for the motor-generator 21 from the EV-CU 70. The torque command value reception section 31 transmits the received torque command value to the torque limiting section 32.

Figure 3:
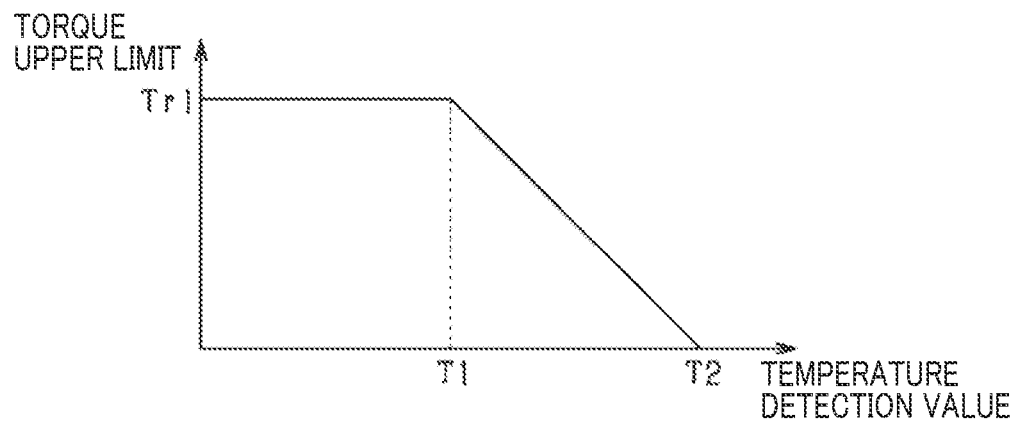
FIG. 3 is a graph showing the relationship between a temperature detection value and a torque upper limit.

The torque limiting section 32 (torque setting section) limits (sets) an upper limit of the torque (hereinafter, referred to as the "torque upper limit") that can be generated by the motor-generator 21 based on the temperature of the coil (hereinafter, referred to as the "coil temperature") of the motor-generator 21 detected by a temperature sensor 21a. Specifically, as shown in FIG. 3, when the coil temperature (temperature information, information about drive control device) is less than T1, the torque limiting section 32 sets the torque upper limit to a torque Tr1. When the coil temperature is greater than or equal to T1, the torque limiting section 32 decreases the torque upper limit as the coil temperature increases. When the coil temperature exceeds T2 (>T1), the torque limiting section 32 sets the torque upper limit to zero. The torque limiting section 32 limits (upper guard) the torque command value to be less than or equal to the torque upper limit and transmits the limited torque command value to the motor drive control section 33. Note that, the torque value as used herein is assumed to be an absolute value.

The motor drive control section 33 (drive control section) controls the driving state of the inverter 25 such that the torque generated by the motor-generator 21 becomes equal to the torque command value in accordance with the current of each phase of the motor-generator 21 detected by a current sensor 21b (sensor) and the rotational angle of the motor-generator 21 detected by a rotational angle sensor 21c. That is, the motor drive control section 33 controls the driving state of the inverter 25 such that the torques generated by the motor-generator 21 and the motor-generator 22 become less than or equal to the torque upper limit.

The adjustment control unit 50 (left adjustment control unit) includes a temperature permission adjustment section 51 and an anomaly detection section 52.

The anomaly detection section 52 receives the current of the motor-generator 21 detected by the current sensor 21b (left current detection value) and the rotational angle of the motor-generator 21 detected by the rotational angle sensor 21c. The anomaly detection section 52 receives the detection values of a variety of sensors input to the EV-CU 70 from the EV-CU 70. The anomaly detection section 52 receives the torque command value (right torque command value) for the motor-generator 22 from the EV-CU 70. The anomaly detection section 52 detects an anomaly in, for example, the motor-generator 21, the inverter 25, the MG-CU 30, and the EV-CU 70 (drive control device) based on these detection values of the sensors and the right torque command value. Upon detecting an anomaly, the anomaly detection section 52 notifies the EV-CU 70 and the adjustment control unit 60 of the anomaly. When the anomaly detection section of the adjustment control unit 60 (right adjustment control unit) detects an anomaly, the anomaly detection section 52 receives an anomaly notification from the adjustment control unit 60.

Figure 4:
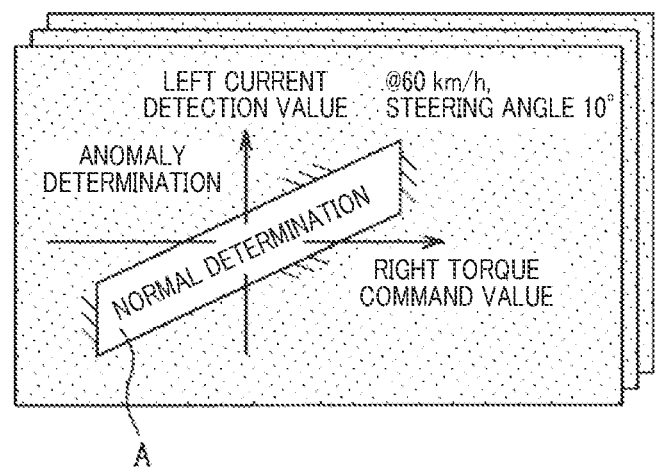
FIG. 4 is a map showing the relationship between a right torque command value, a left current detection value, and a normal determination range.

Specifically, as shown in FIG. 4, the anomaly detection section 52 previously specifies a predetermined range A in which the relationship between the right torque command value and the current that flows through the motor-generator 21 is normal. When the relationship between the right torque command value and the current detected by the current sensor 21b (left current detection value) is out of the predetermined range A, the anomaly detection section 52 detects an anomaly in the drive control device (anomaly determination). The predetermined range A has a predetermined width for the left current detection value and is set such that the left current detection value increases in proportion to the right torque command value. The torque generated by the motor-generator 21 changes in accordance with the current that flows through the motor-generator 21. When the difference between the torques of the motor-generator 21 and the motor-generator 22 increases, the behavior of the electric vehicle 10 may possibly become unstable. For this reason, the predetermined range A is set as an appropriate range of the current that flows through the motor-generator 21 for the right torque command value.

Figure 5:
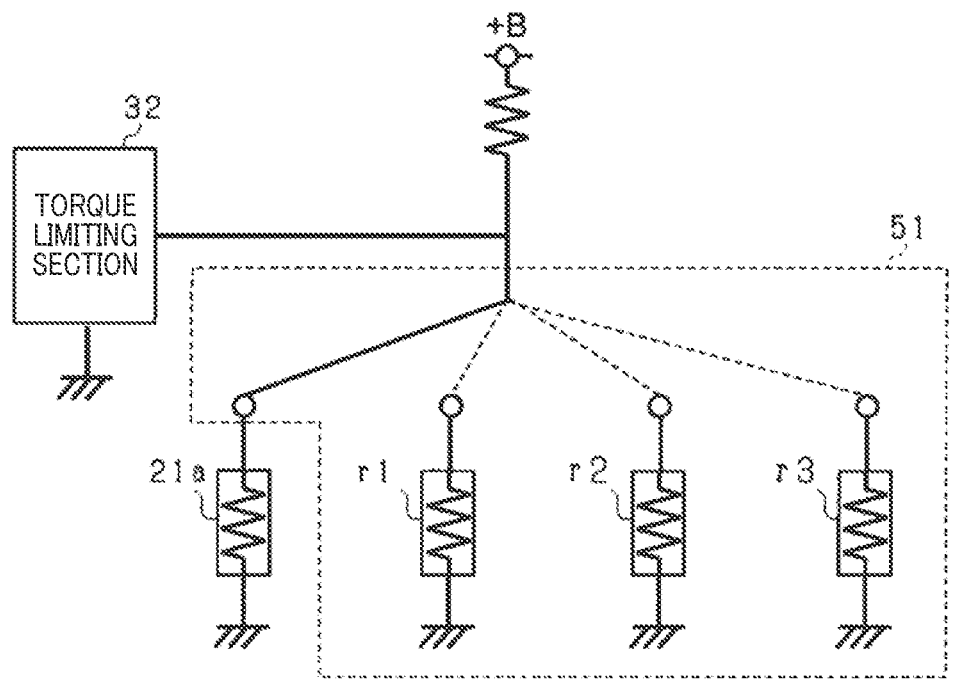
FIG. 5 is a schematic diagram illustrating a temperature permission adjustment section.

When an anomaly is not detected by the anomaly detection section 52, the temperature permission adjustment section 51 acquires the coil temperature from the temperature sensor 21a and outputs the acquired coil temperature to the torque limiting section 32. That is, as shown in FIG. 5, the temperature permission adjustment section 51 connects the temperature sensor 21a to the torque limiting section 32.

When an anomaly is detected by the anomaly detection section 52 or an anomaly notification is received from the anomaly detection section of the adjustment control unit 60, the temperature permission adjustment section 51 (information output section) outputs, to the torque limiting section 32, limiting temperature information (setting information) that limits the upper limit values of the torques of the motor-generators 21 and 22 to a common predetermined value, as the coil temperature (temperature information, information). That is, the temperature permission adjustment section 51 switches the connection of the temperature sensor 21a to the torque limiting section 32 to the connection of any of dummy resistors r1 to r3 to the torque limiting section 32 such that a coil temperature higher than the coil temperature detected by the temperature sensor 21a by a predetermined temperature is output to the torque limiting section 32. Furthermore, the temperature permission adjustment section 51 transmits the coil temperature detected by the temperature sensor 21a to the anomaly detection section 52, and the anomaly detection section 52 transmits the received coil temperature to the adjustment control unit 60. Note that, the temperature permission adjustment section 51 may include a variable resistor rv instead of the dummy resistors r1 to r3 and may adjust the variable resistor rv in accordance with the coil temperature detected by the temperature sensor 21a.

The adjustment control unit 60 has the same configuration as the adjustment control unit 50. The adjustment control unit 60 includes a temperature permission adjustment section 61 corresponding to the temperature permission adjustment section 51 and an anomaly detection section 62 (second detection section) corresponding to the anomaly detection section 52 (first detection section). The MG-CU 40 and the adjustment control unit 60 execute the same controls as the MG-CU 30 and the adjustment control unit 50 on the inverter 26 and the motor-generator 22. That is, the drive control device includes a current sensor that detects the current that flows through a first motor given that one of the motor-generator 21 (left motor) and the motor-generator 22 (right motor) is referred to as the first motor and the other one as a second motor. The drive control device previously specifies a predetermined range A in which the relationship between the command value of the torque to be generated by the second motor and the current that flows through the first motor is normal. When the relationship between the command value of the torque and the current detected by the current sensor is out of the predetermined range A, an anomaly in the drive control device is detected. Note that, the temperature sensor 21a, the torque limiting section 32, the anomaly detection section 52, and the temperature permission adjustment section 51 configure the drive control device.

Figure 6:
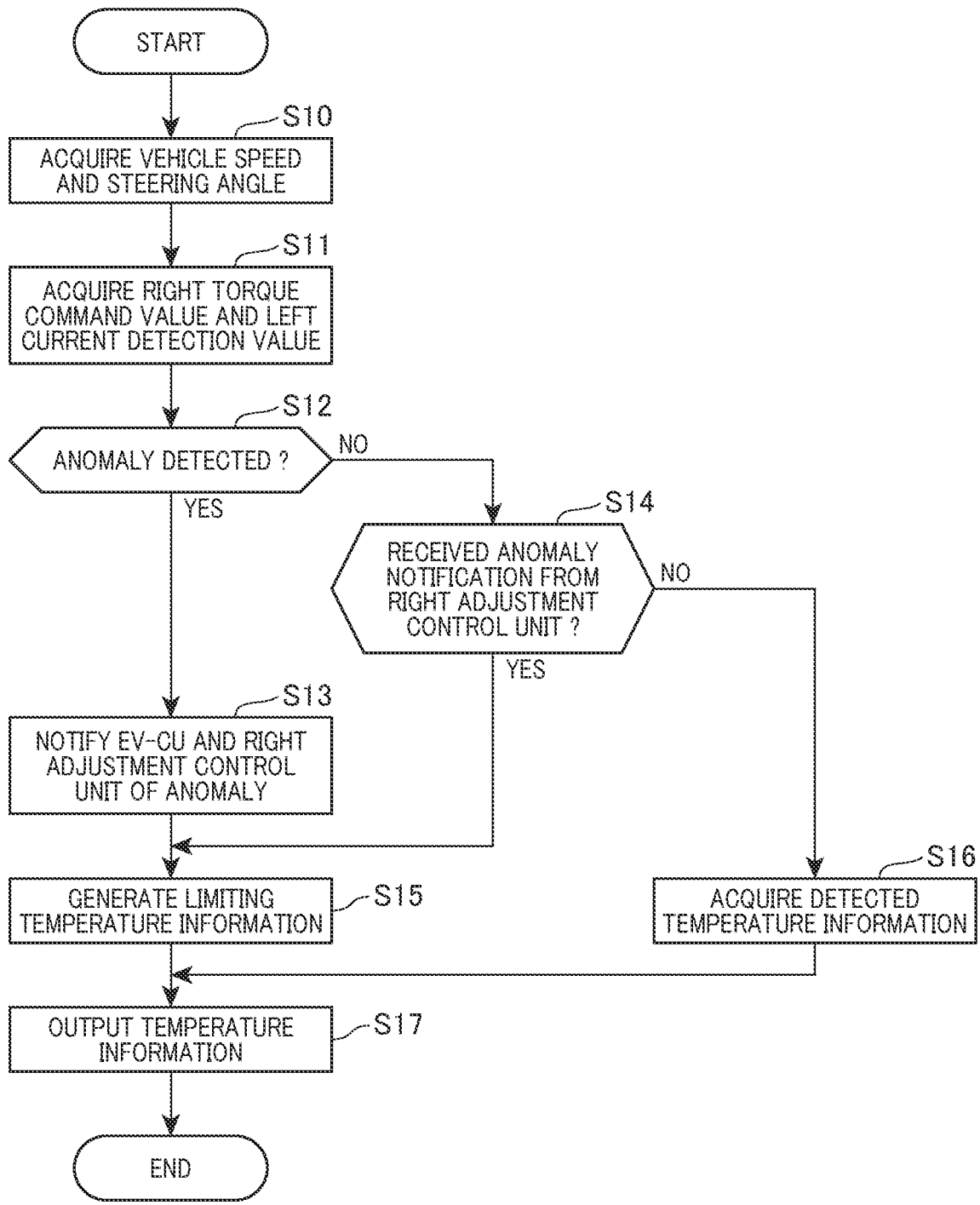
FIG. 6 is a flowchart showing a procedure for detecting an anomaly and outputting temperature information.

FIG. 6 is a flowchart showing a procedure for detecting an anomaly and outputting temperature information. The series of steps are repeatedly executed by the left adjustment control unit 50 at a predetermined cycle. The right adjustment control unit 60 also executes the same processes swapping left and right.

First, the vehicle speed and the steering angle are acquired (S10). Specifically, the vehicle speed detected by the vehicle speed sensor 84 and the steering angle detected by the steering angle sensor 83 are acquired. Note that, the vehicle speed may be calculated from the rotational angle information of the motor without using the vehicle speed sensor.

Subsequently, the right torque command value and the left current detection value are acquired (S11). Specifically, the torque command value (right torque command value) for the motor-generator 22 is received from the EV-CU 70, and the current (left current detection value) of the motor-generator 21 detected by the current sensor 21b is input.

Subsequently, based on the map shown in FIG. 4, it is determined whether an anomaly in the drive control device has been detected (S12). Specifically, as described above, when the relationship between the right torque command value and the left current detection value is out of the predetermined range A, it is determined that an anomaly in the drive control device has been detected. In this determination, upon determining that an anomaly in the drive control device has been detected (S12: YES), the EV-CU 70 and the right adjustment control unit 60 are notified of the anomaly (S13). Additionally, the coil temperature detected by the temperature sensor 21a is transmitted to the right adjustment control unit 60. Subsequently, the process proceeds to step S15.

In the determination of step S12, in response to the determination that no anomaly in the drive control device has been detected (S12: NO), it is determined whether an anomaly notification has been received from the right adjustment control unit 60 (S14). That is, the right adjustment control unit 60 also executes the same processes swapping left and right and determines whether an anomaly in the drive control device has been detected. It is determined whether the right adjustment control unit 60 has detected an anomaly in the drive control device and has notified the left adjustment control unit 50 of the anomaly.

In the determination of step S14, in response to the determination that an anomaly notification has been received from the right adjustment control unit 60 (S14: YES), the limiting temperature information is generated (S15). Specifically, as described above, the coil temperature (limiting temperature information) that limits the upper limit values of the torques of the motor-generators 21 and 22 to the common predetermined value is generated.

In the determination of step S14, in response to the determination that no anomaly notification is received from the right adjustment control unit 60 (S14: NO), detected temperature information is acquired (S16). Specifically, the coil temperature detected by the temperature sensor 21a (detected temperature information) is input.

Subsequently, the limiting temperature information generated by the process of step S15 or the detected temperature information acquired by the process of step S16 is output to the torque limiting section 32 of the MG-CU 50 (S17). Subsequently, the series of steps are temporarily suspended (END).

Note that, the processes of steps S10 to S12 correspond to the processes of the anomaly detection section 52, and the processes of steps S13, S15, and S17 correspond to the processes of the information output section.

The present embodiment described above has the following advantages.

The anomaly detection section 52 detects an anomaly in the drive control device. In response to the anomaly detection section 52 detecting an anomaly, the temperature permission adjustment section 51 outputs, as the coil temperature, to the torque limiting section 32, the limiting temperature information that limits the upper limit values of the torques of the motor-generators 21 and 22 to the common predetermined value. As a result, the torque limiting section 32 limits the upper limit values of the torques of the motor-generators 21 and 22 to the common predetermined value based on the limiting temperature information. This reduces the torque difference between the motor-generators 21 and 22 and inhibits the behavior of the electric vehicle 10 from becoming unstable. Furthermore, the upper limit values of the torques of the motor-generators 21 and 22 are limited instead of the torques generated by the motor-generators 21 and 22 being reduced. This inhibits the torques of the motor-generators 21 and 22 from rapidly decreasing and inhibits the electric vehicle 10 from rapidly decelerating. Moreover, the torques of the motor-generators 21 and 22 are limited upon detection of an anomaly using the torque limiting section 32, which is generally included in the drive control device. This inhibits additional structures from increasing.

The temperature sensor 21a detects the temperature of the coil of the motor-generator 21 as the information about the drive control device. Thus, the torques of the motor-generators 21 and 22 are limited upon detection of an anomaly using the temperature sensor of the motor-generator and the torque limiting section, which limits the upper limit values of the torques based on the temperature of the motor-generator. The temperature sensor and the torque limiting section are generally included in the drive control device.

The anomaly detection section 52 previously specifies the predetermined range A in which the relationship between the command value of the torque to be generated by the motor-generator 22 and the current that flows through the motor-generator 21 is normal. When the relationship between the command value of the torque of the motor-generator 22 and the current of the motor-generator 21 detected by the current sensor 21b is out of the predetermined range A, the anomaly detection section 52 detects an anomaly in the drive control device. Thus, when there is a risk that the behavior of the electric vehicle 10 will become unstable, an anomaly in the drive control device is detected.

In response to the detection of an anomaly, the temperature permission adjustment section 51 switches the connection of the temperature sensor 21a to the torque limiting section 32 to the connection of any of the dummy resistors r1 to r3 to the torque limiting section 32 such that a coil temperature higher than the coil temperature detected by the temperature sensor 21a by a predetermined temperature is output to the torque limiting section 32. Thus, the torque upper limit is limited in accordance with the current coil temperature using the relationship between the temperature detection value and the torque upper limit shown in FIG. 3. This inhibits the torque upper limit from rapidly decreasing.

Note that, the embodiment described above may be modified as follows. The components that are the same as the components in the above embodiment are given the same reference numerals, and detailed explanations are omitted.

Since the difference between the temperature of the motor-generator 21 and the temperature of the motor-generator 22 rarely becomes large, the temperature of only one of the motor-generator 21 and the motor-generator 22 needs to be detected by the temperature sensor. The upper limit values of the torques that can be generated by the motor-generator 21 and the motor-generator 22 may be limited based on the temperature (temperature information, information about drive control device) detected by one temperature sensor.

Upon detection of a predetermined anomaly, the temperature permission adjustment section 51 may switch the connection of the temperature sensor 21a to the torque limiting section 32 to, for example, the connection of the dummy resistor r3 to the torque limiting section 32, so that a coil temperature that limits the torque upper limit to a minimum torque that allows the electric vehicle 10 to evacuate is output to the torque limiting section 32. In this case, the connection of the temperature sensor 21a to the torque limiting section 32 may be sequentially switched to the connection of the dummy resistors r1 to the torque limiting section 32, the connection of the dummy resistors r2 to the torque limiting section 32, and the connection of the dummy resistors r3 to the torque limiting section 32. That is, in response to the detection of a predetermined anomaly, the temperature permission adjustment section 51 may gradually limit the upper limit values of the torques of the motor-generators 21 and 22 while setting the upper limit values to the common predetermined value.

Figure 7:
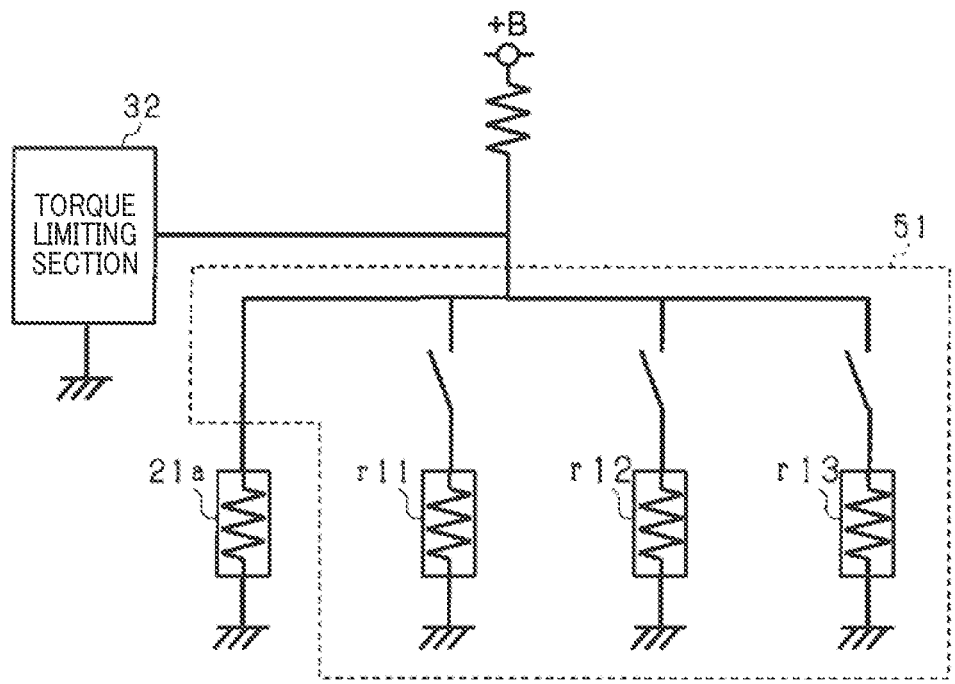
FIG. 7 is a schematic diagram illustrating a modified example of a temperature permission adjustment section.

In response to the detection of an anomaly, as shown in FIG. 7, the temperature permission adjustment section 51 may connect at least one of dummy resistors r11 to r13 to the torque limiting section 32 in addition to connecting the temperature sensor 21a to the torque limiting section 32, so that a coil temperature higher than the coil temperature detected by the temperature sensor 21a by a predetermined temperature is output to the torque limiting section 32. Alternatively, in response to the detection of an anomaly, the temperature permission adjustment section 51 may output a digital signal corresponding to the detection value of the temperature sensor 21a to the torque limiting section 32.

When the left torque command value (first command value) transmitted by the EV-CU 70 (upper-level control unit) is received properly, the left torque command value received by the anomaly detection section 52 (first detection section) from the EV-CU 70 is supposed to match with the left torque command value received by the anomaly detection section 52 from the anomaly detection section 62 (second detection section). In contrast, when the left torque command value received by the anomaly detection section 52 from the EV-CU 70 does not match with the left torque command value received by the anomaly detection section 52 from the anomaly detection section 62, the left torque command value transmitted by the EV-CU 70 might not be received properly.

Thus, the anomaly detection section 52 may detect an anomaly in the drive control device when an absolute value of the difference between the left torque command value received from the EV-CU 70 and the left torque command value received from the anomaly detection section 62 is greater than a predetermined value. Alternatively, the anomaly detection section 62 may detect an anomaly in the drive control device when an absolute value of the difference between the right torque command value (second command value) received from the EV-CU 70 and the right torque command value received from the anomaly detection section 52 is greater than a predetermined value. With this configuration, an anomaly in the drive control device may be detected when there is a risk that the command value of the torque transmitted by the EV-CU 70 is not received properly. Note that, the MG-CUs 30 and 40 may calculate the checksums of the received torque command values and detect an anomaly in the drive control device when the checksums do not match. Alternatively, the EV-CU 70 may detect an anomaly in the drive control device based on the detection values of a variety of sensors.

Figure 8:
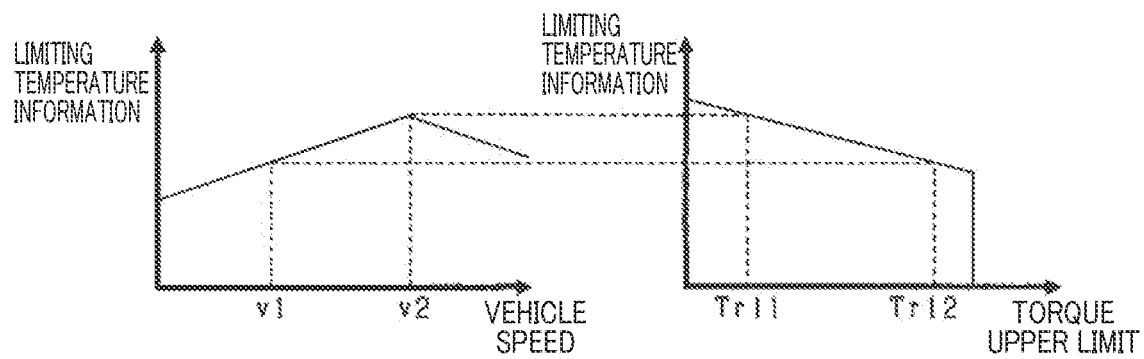
FIG. 8 is a graph showing the relationship between a vehicle speed, limiting temperature information, and a torque upper limit.

How much the upper limit values of the torques of the motor-generators 21 and 22 should be limited changes depending on the speed of the electric vehicle 10 when an anomaly is detected. FIG. 8 is a graph showing the relationship between the vehicle speed, the limiting temperature information, and the torque upper limit. The limiting temperature information (coil temperature) increases as the vehicle speed increases until a vehicle speed v2 and gradually decreases after exceeding the vehicle speed v2. The vehicle speed v2 is a speed that is not reached on a general road but is reached on an expressway and may be, for example, 100 [km/h]. Since an expressway has gentle curves and a wide road width, the relationship between the vehicle speed and the limiting temperature information is set not to lower the torque upper limit too much.

The temperature permission adjustment section 51 calculates the limiting temperature information in accordance with the vehicle speed using the left graph in FIG. 8 and outputs the limiting temperature information to the torque limiting section 32. The torque limiting section 32 sets the torque upper limit in accordance with the limiting temperature information using the right graph in FIG. 8. For example, at a vehicle speed v1, the torque upper limit is set to a torque Tr12, and at the vehicle speed v2, the torque upper limit is set to a torque Tr11. That is, the temperature permission adjustment section 51 sets the torque upper limit (predetermined value) based on the speed of the electric vehicle 10. Thus, the upper limit values of the torques of the motor-generators 21 and 22 are limited to a predetermined value corresponding to the speed of the electric vehicle 10 when an anomaly is detected. Note that, the vehicle speed corresponds to the information about the drive control device.

The temperature permission adjustment section 51 may set the torque upper limit (predetermined value) based on the depression amount (operation amount) of the accelerator pedal (accelerator operation member), the torque command value, or the steering angle besides the vehicle speed. In this case, the greater the depression amount of the accelerator pedal or the torque command value, the higher the limiting temperature information (coil temperature) should be set to. Also, the smaller the steering angle, the higher the limiting temperature information (coil temperature) should be set to. That is, the smaller the steering angle, the closer the electric vehicle 10 is to traveling straight. Thus, the torque upper limit (predetermined value) should be set to a small value. This inhibits the behavior of the vehicle from becoming unstable.

Figure 9:
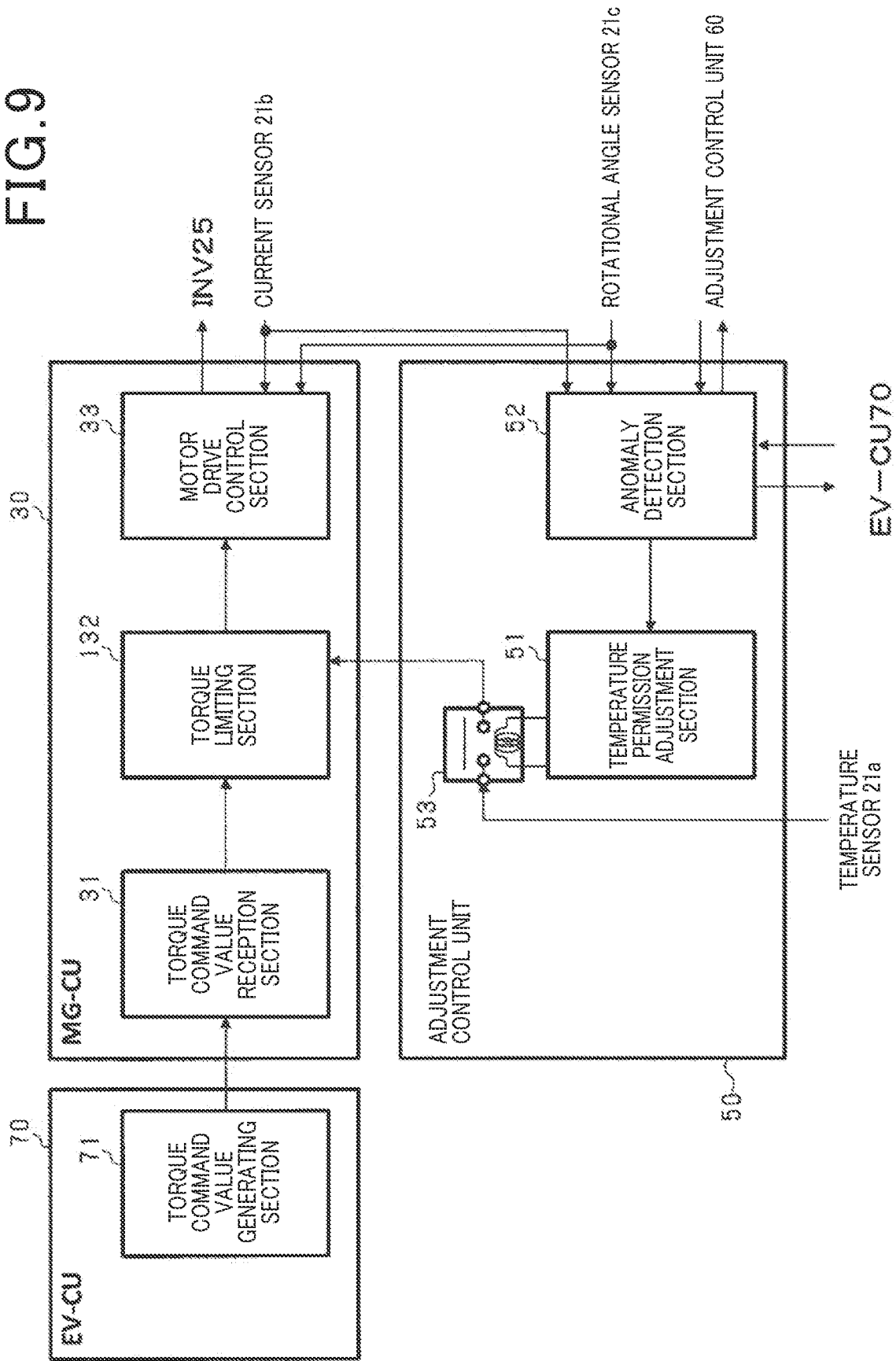
FIG. 9 is a block diagram illustrating a modified example of an adjustment control unit.

When the coil temperature (temperature information, information) is not input from the temperature sensor 21a (sensor), there is a risk of not being able to drive the motor-generator 21 (motor) appropriately. Thus, as shown in FIG. 9, the MG-CU 30 of the drive control device includes a torque limiting section 132, which limits the upper limit of the torque that can be generated by the motor-generator 21 when the coil temperature is not input from the temperature sensor 21a. Note that, the MG-CU 40 of the drive control device includes a torque limiting section that limits the upper limit of the torque that can be generated by the motor-generator 22 when the coil temperature is not input from the temperature sensor that detects the temperature of the motor-generator 22.

The torque limiting section 132 (torque setting section) limits the upper limit values of the torques that can be generated by the motor-generator 21 and the motor-generator 22 when the coil temperature is not input from the temperature sensor 21a, and the temperature permission adjustment section 51 disconnects the temperature sensor 21a from the torque limiting section 132 by a switch 53 when an anomaly has been detected by the anomaly detection section 52. Thus, in response to the detection of an anomaly, the state in which the coil temperature is not input to the torque limiting section 132 from the temperature sensor 21a is intentionally made. Thus, the torques of the motor-generators 21 and 22 are limited upon detection of an anomaly using the torque limiting section that limits the upper limit values of the torques of the motor-generators 21 and 22 when the coil temperature is not input from the temperature sensor. The torque limiting section is included in the drive control device.

The drive control device may include a temperature sensor that detects the temperature of the inverter 25 (power inverter), and the torque limiting section 32 may limit the torque upper limit values of the motor-generators 21 and 22 based on the temperature of the inverter 25 detected by the temperature sensor. Similarly, the drive control device may include a temperature sensor that detects the temperature of the inverter 26 (power inverter), and the torque limiting section may limit the torque upper limit values of the motor-generators 21 and 22 based on the temperature of the inverter 26 detected by the temperature sensor. In this case, in response to the anomaly detection section 52 detecting an anomaly, the temperature permission adjustment section 51 may output the limiting information (setting information) that limits (sets) the upper limit values of the torques of the motor-generators 21 and 22 to the common predetermined value to the torque limiting section, as the temperature of the inverter 25 or 26. With this configuration, the torques of the motor-generators 21 and 22 are limited upon detection of an anomaly using the temperature sensor for the inverter 25 or 26 and the torque limiting section, which limits the torque upper limit based on the temperature of the inverter 25 or 26. The temperature sensor and the torque limiting section are included in the drive control device.

When a high voltage is applied across the coils of the motor-generators 21 and 22, the lower the atmospheric pressure, the more likely partial discharge occurs. For this reason, the drive control device may include an atmospheric pressure sensor that detects the atmospheric pressure, and the lower the detected atmospheric pressure, the more the rising of the voltage of the inverters 25 and 26 may be retarded. In this case, the more the rising of the voltage is retarded, the greater the temperature increase of the inverters 25 and 26 becomes. Thus, in response to the anomaly detection section 52 detecting an anomaly, the temperature permission adjustment section 51 may output, to the torque limiting section, the limiting information (setting information) that limits (sets) the upper limit values of the torques of the motor-generators 21 and 22 to the common predetermined value, as the atmospheric pressure. With this configuration, the drive control device that includes the atmospheric pressure sensor and the torque limiting section, which limits the upper limit values of the torques based on the atmospheric pressure, may limit the torques of the motor-generators 21 and 22 upon detection of an anomaly using the atmospheric pressure sensor and the torque limiting section.

The drive control device may include a temperature sensor that detects the temperature of a coolant that cools the motor-generators 21 and 22 and the inverters 25 and 26, and the torque limiting section 32 may limit the torque upper limit values of the motor-generators 21 and 22 based on the temperature of the coolant detected by the temperature sensor. In this case, in response to the anomaly detection section 52 detecting an anomaly, the temperature permission adjustment section 51 may output, to the torque limiting section, the limiting information (setting information) that limits (sets) the upper limit values of the torques of the motor-generators 21 and 22 to the common predetermined value, as the coolant temperature. With this configuration, the torques of the motor-generators 21 and 22 may be limited upon detection of an anomaly using the coolant temperature sensor and the torque limiting section, which limits the torque upper limit based on the coolant temperature. The coolant temperature sensor and the torque limiting section are included in the drive control device.

A single common torque limiting section may be provided for the motor-generators 21 and 22.

The motor-generators 21 and 22, the inverters 25 and 26, the MG-CUs 30 and 40, and the adjustment control units 50 and 60 may be provided for the corresponding one of the rear left and right wheels 13 and 14 instead of the front left and right wheels 11 and 12. Alternatively, the motor-generators 21 and 22, the inverters 25 and 26, the MG-CUs 30 and 40, and the adjustment control units 50 and 60 may be provided for the corresponding one of the rear left and right wheels 13 and 14 in addition to the corresponding one of the front left and right wheels 11 and 12. Alternatively, the motor-generators 21 and 22, the inverters 25 and 26, the MG-CUs 30 and 40, and the adjustment control units 50 and 60 may be provided for the corresponding one of the left front and rear wheels 11 and 13 instead of the front left and right wheels 11 and 12. Alternatively, the motor-generators 21 and 22, the inverters 25 and 26, the MG-CUs 30 and 40, and the adjustment control units 50 and 60 may be provided for the corresponding one of the front left wheel 11 and the rear right wheel 14 instead of the front left and right wheels 11 and 12.

The anomaly detection section 52 may detect an anomaly state, which is the state of the drive control device causing an anomaly. In response to the anomaly detection section 52 detecting the anomaly state, the temperature permission adjustment section 51 (information output section) may output, to the torque limiting section 32 (torque setting section), the limiting information (setting information) that sets the common predetermined value corresponding to the anomaly state as the upper limit values of the torques of the motor-generator 21 and the motor-generator 22.

With the above configuration, the anomaly detection section 52 not only detects an anomaly in the drive control device but also detects an anomaly state, which is the state of the drive control device causing an anomaly. In response to the detection of an anomaly state, the limiting information that sets the common predetermined value corresponding to the anomaly state as the upper limit values of the torques of the motor-generator 21 and the motor-generator 22 is output to the torque limiting section 32. Thus, the common predetermined value is set as the upper limit values of the torques of the motor-generator 21 and the motor-generator 22 in accordance with the anomaly state. This allows the upper limit values of the torques of the motor-generator 21 and the motor-generator 22 to be more appropriately set, which further inhibits the behavior of the electric vehicle 10 from becoming unstable and the electric vehicle 10 from rapidly decelerating.

Figure 10:
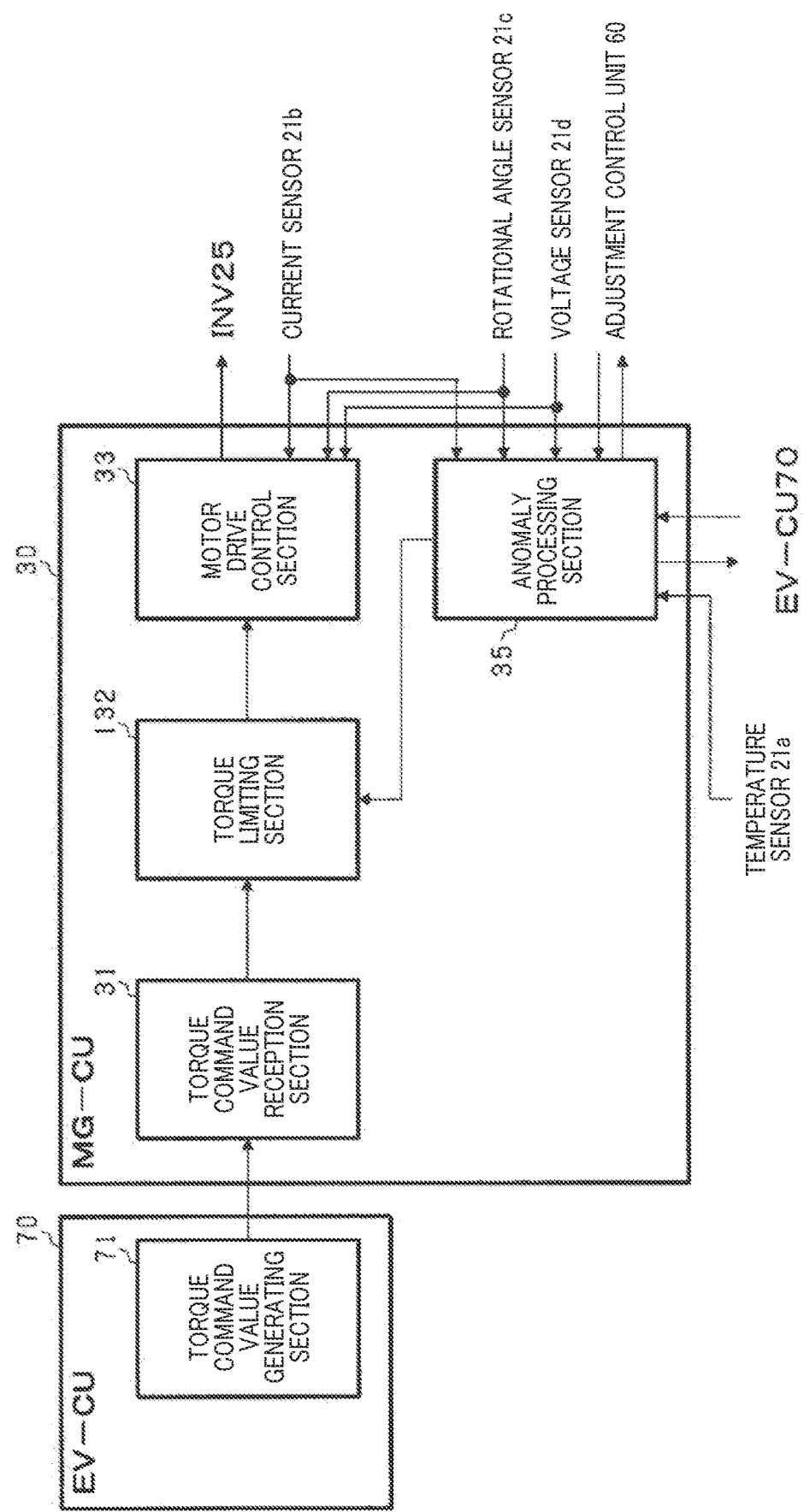
FIG. 10 is a block diagram illustrating a modified example of a drive control device.

As shown in FIG. 10, the MG-CU 30 may include an anomaly processing section 35. The anomaly processing section 35 detects an anomaly state, which is the state of the drive control device causing an anomaly. Upon detecting the anomaly state, the anomaly processing section 35 outputs, to the torque limiting section 32, the limiting information that sets the common predetermined value corresponding to the anomaly state as the upper limit values of the torques of the motor-generator 21 and the motor-generator 22. In this case, the adjustment control units 50 and 60 may be omitted.

With the above configuration, in response to the anomaly detection section 35 detecting an anomaly state, the limiting information that sets the common predetermined value corresponding to the anomaly state as the upper limit values of the torques of the motor-generator 21 and the motor-generator 22 is output to the torque limiting section 32 by the anomaly detection section 35. In this case also, the same operational advantages as the above embodiment are achieved.

The motor drive control section 33 may be capable of executing a first control mode and a second control mode, which differ from each other in the mode of controlling the torques generated by the motor-generator 21 and the motor-generator 22. The common predetermined value corresponding to the anomaly state may be set to a value corresponding to which of the first control mode and the second control mode is executed by the motor drive control section 33 when an anomaly state is detected. For example, the first control mode feedback-controls the voltage applied to the motor-generators 21 and 22 by PWM control so that the current detected by the current sensor 21b (22b) becomes equal to a target current. The second control mode controls the rotational angle at which a rectangular-wave voltage is applied to the motor-generators 21 and 22 by rectangular wave control.

With the above configuration, the motor drive control section 33 is capable of executing the first control mode and the second control mode, which differ from each other in the mode of controlling the torques generated by the motor-generator 21 and the motor-generator 22. Thus, the first control mode and the second control mode are selected in accordance with the traveling condition of the electric vehicle 10. The influence (contribution degree) of an anomaly on the torque when the anomaly has occurred in the drive control device differs between the first control mode and the second control mode, which differ from each other in the mode of controlling the torques. For example, when an anomaly has occurred in the current sensor 21b (22b), there is a risk that the torque will be changed abruptly with the PWM control, whereas the torque is unlikely to be changed abruptly with the rectangular wave control.

In this respect, the common predetermined value corresponding to the anomaly state is set to a value corresponding to which of the first control mode and the second control mode is executed by the motor drive control section 33 (a value corresponding to the influence) when an anomaly state is detected. Thus, the common predetermined value is appropriately set as the upper limit values of the torques of the motor-generator 21 and the motor-generator 22 in accordance with the influence of the anomaly on the torque involved in the first control mode and the second control mode.

Even in an event of an anomaly in the command value of the torques to be generated by the motor-generator 21 and the motor-generator 22, the risk to the electric vehicle 10 is small if the torque is not erroneously increased. For this reason, in an event of an anomaly in at least one of the left torque command value (first command value), which is the command value of the torque to be generated by the motor-generator 21, and the right torque command value (second command value), which is the command value of the torque to be generated by the motor-generator 22, the common predetermined value corresponding to the anomaly state may be set to the first command value or the second command value used in a predetermined period before the event of the anomaly. Whether there is an anomaly in the left torque command value is determined by, as described above for example, whether the absolute value of the difference between the left torque command value received from the EV-CU 70 and the left torque command value received from the adjustment control unit 60 is greater than the predetermined value. The predetermined period before the event of an anomaly may be, for example, a period immediately before the event of an anomaly or a period that is several seconds before (shortly before) the event of an anomaly. Note that, in the following description, the same applies to the phrase "the predetermined period before".

With the above configuration, even in the event of an anomaly in at least one of the left command value and the right torque command value, the upper limit values of the torques is set to the left torque command value or the right torque command value used in the predetermined period before the event of the anomaly. This inhibits the torques generated by the motor-generator 21 and the motor-generator 22 from erroneously increasing and allows the electric vehicle 10 to travel safely. Furthermore, even in the event of an anomaly in the command value of the torque, the upper limit values of the torques are not lowered as much as possible from the state before the event of the anomaly, so that the electric vehicle 10 keeps traveling.

When a reference output (zero point), which is the output of the current sensor 21b (22b) when the current is detected as zero, is out of the predetermined range, the common predetermined value corresponding to the anomaly state may be set to the left torque command value or the right torque command value used in the predetermined period before the reference output is out of the predetermined range. For example, the current sensor 21b (22b) outputs a voltage of 0 to 5 [V] in response to a current of −500 [A] to 500 [A]. In this case, the reference output, which is the output of the current sensor 21b (22b) when the current is detected as 0 [A], is 2.5 [V]. The predetermined range is set to, for example, 2.0 [V] to 3.0 [V].

Even when the reference output of the current sensor 21b is out of the predetermined range (hereinafter, referred to as an "offset anomaly"), the detected current rarely changes abruptly. Thus, even in the event of an offset anomaly, the upper limit values of the torques may be set to the left torque command value or the right torque command value used in the predetermined period before the event of the offset anomaly. Such a configuration allows the electric vehicle 10 to keep traveling without lowering the upper limit values of the torques as much as possible while allowing the electric vehicle 10 to travel safely.

In the event of a predetermined anomaly in the current sensor 21b other than the offset anomaly, a current may be detected erroneously, and the torques generated by the motor-generator 21 and the motor-generator 22 may possibly change abruptly. The predetermined anomaly includes, for example, the disconnection of the wiring of the current sensor 21b, a short-circuit of the current sensor 21b, and a gain anomaly of the current sensor 21b. In response to the detection of a predetermined anomaly in the current sensor 21b other than the case in which the reference output is out of the predetermined range, the common predetermined value corresponding to the anomaly state may be set to a first correction command value or a second correction command value. The first correction command value is obtained by decreasing the left torque command value used in the predetermined period before the predetermined anomaly is detected by a predetermined degree. The second correction command value is obtained by decreasing the right torque command value used in the predetermined period before the predetermined anomaly is detected by a predetermined degree. The first correction command value (the second correction command value) may be, for example, a value that is half or one third of the left torque command value (the right torque command value) or a value obtained by subtracting a predetermined value from the left torque command value (the right torque command value).

With the above configuration, in response to the detection of a predetermined anomaly other than the offset anomaly, the upper limit values of the torques of the motor-generator 21 and the motor-generator 22 is set to the first correction command value or the second correction command value. The first correction command value is obtained by reducing the left torque command value used in the predetermined period before the predetermined anomaly is detected by a predetermined degree. The second correction command value is obtained by reducing the right torque command value used in the predetermined period before the predetermined anomaly is detected by a predetermined degree. Thus, when there is a risk that the torques generated by the motor-generator 21 and the motor-generator 22 will change abruptly, the electric vehicle 10 is allowed to keep traveling while traveling safely.

The drive control device may include a voltage sensor 21d (22d), which detects the voltage applied to at least one of the motor-generator 21 and the motor-generator 22. In response to the detection of an anomaly in the voltage sensor 21d, the common predetermined value corresponding to the anomaly state may be set to the left torque command value or the right torque command value used in the predetermined period before the anomaly in the voltage sensor 21d is detected.

Even in an event of an anomaly in the voltage sensor 21d, unless the currents that flow through the motor-generator 21 and the motor-generator 22 change abruptly, the torques rarely change abruptly. In this respect, in response to the detection of an anomaly in the voltage sensor 21d, the upper limit values of the torques is set to the left torque command value or the right torque command value used in the predetermined period before the anomaly in the voltage sensor 21d is detected. This allows the electric vehicle 10 to keep traveling without lowering the upper limit values of the torques as much as possible while allowing the electric vehicle 10 to travel safely.

In an event of an anomaly in the rotational angle sensor 21c (22c), the motor-generator 21 and the motor-generator 22 can no longer be controlled appropriately in accordance with the rotational angle, and the torques generated by the motor-generator 21 and the motor-generator 22 may possibly change abruptly. The common predetermined value corresponding to the anomaly state may be set to zero when there is an anomaly in the rotational angle sensor 21c (22c). With this configuration, when there is a risk that the motor-generator 21 and the motor-generator 22 cannot be controlled appropriately, a high priority is given to safety, and the electric vehicle 10 is exceptionally stopped. Note that, in setting the common predetermined value corresponding to the anomaly state to zero, the common predetermined value may be gradually brought to zero.

In an event of an anomaly in the calculation function of at least one of the torque limiting section 32 and the motor drive control section 33, the motor-generator 21 and the motor-generator 22 can no longer be controlled appropriately, and the torques generated by the motor-generator 21 and the motor-generator 22 may possibly change abruptly. The event of an anomaly in the calculation function refers to a case in which, for example, an anomaly occurs in a microcomputer (computing unit) that configures the torque limiting section 32 and the motor drive control section 33. The common predetermined value corresponding to the anomaly state may be set to zero when there is an anomaly in the calculation function of at least one of the torque limiting section 32 and the motor drive control section 33. With this configuration, when there is a risk that the motor-generator 21 and the motor-generator 22 cannot be controlled appropriately, a high priority is given to safety, and the electric vehicle 10 is exceptionally stopped. Note that, in setting the common predetermined value corresponding to the anomaly state to zero, the common predetermined value may be gradually brought to zero.

Each drive control device described above may be applied to not only the electric vehicle 10 but also a hybrid vehicle (vehicle) including an engine in addition to the motor-generators 21 and 22 as a power source. The electric vehicle is not limited to one that includes a battery as a source of energy but may be a fuel cell vehicle (FCV) that includes a fuel cell as the source of energy.

Although the present disclosure has been described in accordance with the embodiments, it is understood that the present disclosure is not limited to the embodiments and the configurations thereof. The present disclosure embraces various modifications and deformations that come within the range of equivalency. Additionally, various combinations and forms, or other combinations and forms including only one or more additional elements, or a portion of one additional element are included in the scope and ideas obtainable from the present disclosure.

What is claimed is:

1. A drive control device applicable to a vehicle including a first motor which drives a first wheel and a second motor which drives a second wheel, the second wheel being independently from the first wheel, the drive control device comprising:
 a sensor configured to detect information about the drive control device;
 a torque setting section configured to set upper limit values of torques that can be generated by the first motor and the second motor based on the information detected by the sensor;
 an anomaly detection section configured to detect an anomaly in the drive control device;
 an information output section configured to, in response to the anomaly detection section detecting the anomaly, output, to the torque setting section, setting information that sets the upper limit values of the torques of the first motor and the second motor to a common predetermined value, as the information; and
 a drive control section configured to control the torques generated by the first motor and the second motor to become less than or equal to the upper limit values set by the torque setting section.

2. The drive control device for a vehicle according to claim 1, wherein the sensor is configured to detect temperature information as the information.

3. The drive control device for a vehicle according to claim 2, wherein the temperature information is a temperature of at least one of the first motor and the second motor.

4. The drive control device for a vehicle according to claim 2, wherein
 the first motor and the second motor are AC motors,
 the drive control device includes: a first power inverter which changes supplied DC power to AC power and supplies the AC power to the first motor, and a second power inverter which changes the supplied DC power to AC power and supplies the AC power to the second motor, and
 the sensor is configured to detect a temperature of at least one of the first power inverter and the second power inverter as the temperature information.

5. The drive control device for a vehicle according to claim 2, wherein the sensor is configured to detect a temperature of a coolant as the temperature information.

6. The drive control device for a vehicle according to claim 1, wherein
 the first motor and the second motor are AC motors,
 the drive control device includes: a first power inverter which changes supplied DC power to AC power and supplies the AC power to the first motor, and a second power inverter which changes the supplied DC power to AC power and supplies the AC power to the second motor, and
 the sensor is configured to detect an atmospheric pressure as the information.

7. The drive control device for a vehicle according to claim 1, wherein the sensor is configured to detect a speed of the vehicle as the information.

8. The drive control device for a vehicle according to claim 1, wherein,
 the torque setting section is configured to set the upper limit values of the torques that can be generated by the first motor and the second motor, when the information is not input from the sensor, and
 the information output section is configured to disconnect the sensor from the torque setting section, in response to the anomaly detection section detecting the anomaly.

9. The drive control device for a vehicle according to claim 1, wherein
 the drive control device includes a current sensor configured to detect a current that flows through the first motor, and
 the anomaly detection section is configured to:
  previously specify a predetermined range in which a relationship between a command value of a torque to be generated by the second motor and a current that flows through the first motor is normal, and
  detect the anomaly in the drive control device when the relationship between the command value and the current detected by the current sensor is out of the predetermined range.

10. The drive control device for a vehicle according to claim 1, wherein
 the anomaly detection section includes a first detector configured to detect an anomaly related to the first motor, and a second detector configured to detect an anomaly related to the second motor,
 the drive control device includes an upper-level control unit configured to transmit both a first command value and a second command value to both the first detector and the second detector, the first command value being a command value of a torque to be generated by the first motor, the second command value being a command value of a torque to be generated by the second motor,
 the first detector is configured to transmit the second command value received from the upper-level control unit to the second detector,
 the second detector is configured to transmit the first command value received from the upper-level control unit to the first detector,
 the first detector is configured to detect the anomaly in the drive control device when an absolute value of a difference between the first command value received from the upper-level control unit and the first command value received from the second detector is greater than a predetermined value, and
 the second detector is configured to detect the anomaly in the drive control device when an absolute value of a difference between the second command value received from the upper-level control unit and the second command value received from the first detector is greater than a predetermined value.

11. The drive control device for a vehicle according to claim 1, wherein
 the anomaly detection section is configured to detect an anomaly state, which is a state of the anomaly in the drive control device, and
 the information output section is configured to output, to the torque setting section, the setting information that sets the upper limit values of the torques of the first motor and the second motor to the common predetermined value corresponding to the anomaly state, as the information, in response to the anomaly detection section detecting the anomaly state.

12. The drive control device for a vehicle according to claim 11, wherein
the drive control section is capable of executing a first control mode and a second control mode, which differ from each other in a mode of controlling torques generated by the first motor and the second motor, and
in response to detection of the anomaly state, the common predetermined value corresponding to the anomaly state is set to a value corresponding to which of the first control mode and the second control mode is executed by the drive control section.

13. The drive control device for a vehicle according to claim 11, wherein,
in response to an anomaly occurring in at least one of a first command value, which is a command value of a torque to be generated by the first motor, and a second command value, which is a command value of a torque to be generated by the second motor,
the common predetermined value corresponding to the anomaly state is set to the first command value or the second command value used in a predetermined period before the event of the anomaly.

14. The drive control device for a vehicle according to claim 11, wherein
the sensor includes a current sensor configured to detect a current that flows through at least one of the first motor and the second motor, and
when a reference output, which is an output of the current sensor when the current is detected as zero, is out of a predetermined range, the common predetermined value corresponding to the anomaly state is set to a first command value or a second command value, the first command value being a command value of a torque to be generated by the first motor used in a predetermined period before the reference output is out of the predetermined range, and the second command value being a command value of a torque to be generated by the second motor used in the predetermined period before the reference output is out of the predetermined range.

15. The drive control device for a vehicle according to claim 14, wherein,
in response to detection of a predetermined anomaly in the current sensor other than a case in which the reference output is out of the predetermined range, the common predetermined value corresponding to the anomaly state is set to a first correction command value or a second correction command value, the first correction command value being obtained by reducing the first command value used in a predetermined period before the detection of the predetermined anomaly by a predetermined degree, and the second correction command value being obtained by reducing the second command value used in the predetermined period before the detection of the predetermined anomaly by a predetermined degree.

16. The drive control device for a vehicle according to claim 11, wherein
the sensor includes a voltage sensor configured to detect a voltage that is applied to at least one of the first motor and the second motor, and
in response to detection of an anomaly in the voltage sensor, the common predetermined value corresponding to the anomaly state is set to a first command value or a second command value, the first command value being a command value of a torque to be generated by the first motor used in a predetermined period before the detection of the anomaly in the voltage sensor, the second command value being a command value of a torque to be generated by the second motor used in the predetermined period before the detection of the anomaly in the voltage sensor.

17. The drive control device for a vehicle according to claim 11, wherein
the sensor includes a rotational angle sensor configured to detect a rotational angle of at least one of the first motor and the second motor, and
the common predetermined value corresponding to the anomaly state is set to zero when there is an anomaly in the rotational angle sensor.

18. The drive control device for a vehicle according to claim 11, wherein the common predetermined value corresponding to the anomaly state is set to zero when there is an anomaly in a calculation function of at least one of the torque setting section and the drive control section.

19. A drive control device applicable to a vehicle including a first motor which drives a first wheel and a second motor which drives a second wheel, the second wheel being independently from the first wheel, the drive control device comprising:
a sensor configured to detect information about the drive control device;
a torque setting section configured to set upper limit values of torques that can be generated by the first motor and the second motor based on the information detected by the sensor;
an anomaly processing section configured to:
detect an anomaly state, which is a state of an anomaly of the drive control device, and
output, to the torque setting section, setting information that sets the upper limit values of the torques of the first motor and the second motor to a common predetermined value corresponding to the anomaly state, as the information, in response to detecting the anomaly state; and
a drive control section configured to control the torques generated by the first motor and the second motor to become less than or equal to the upper limit values set by the torque setting section.

* * * * *